(12) United States Patent
Monson et al.

(10) Patent No.: US 6,848,666 B1
(45) Date of Patent: Feb. 1, 2005

(54) SHOCK AND VIBRATION SYSTEM

(75) Inventors: Robert James Monson, St. Paul, MN (US); Wesley Eugene Revely, Apple Valley, MN (US); Trevor J. McCollough, Minneapolis, MN (US)

(73) Assignee: Lockheed Martin, Eagan, MN (US)

( * ) Notice: Subject to any disclaimer, the term of this patent is extended or adjusted under 35 U.S.C. 154(b) by 320 days.

(21) Appl. No.: 09/694,458

(22) Filed: Oct. 23, 2000

(51) Int. Cl.[7] .............................................. F16M 13/00
(52) U.S. Cl. ..................................................... 248/609
(58) Field of Search .............................. 248/603, 609, 248/604, 219.4, 632, 634, 635; 267/153, 141

(56) References Cited

U.S. PATENT DOCUMENTS

| | | | | | |
|---|---|---|---|---|---|
| 2,924,420 A | * | 2/1960 | Fink | .......................... | 248/562 |
| 3,565,386 A | * | 2/1971 | Lemkuil et al. | ............ | 248/573 |
| 4,233,980 A | * | 11/1980 | McRae et al. | .............. | 606/201 |
| 4,471,935 A | * | 9/1984 | Chiba et al. | ................ | 248/638 |
| 5,031,885 A | * | 7/1991 | Schwerdt | ................. | 267/141.2 |

* cited by examiner

Primary Examiner—Leslie A. Braun
Assistant Examiner—A. Joseph Wujciak

(57) ABSTRACT

A compact shock and vibration isolation system wherein a plurality of shock mounts are cantileverly and symmetrically positioned between an outer member and an inner member which is centrally positioned with respect to the outer member to enable the equipment located thereon to assist in attention of shock and vibration.

10 Claims, 2 Drawing Sheets

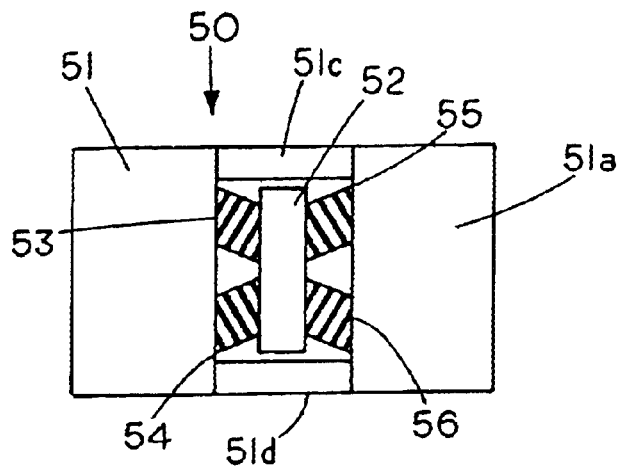
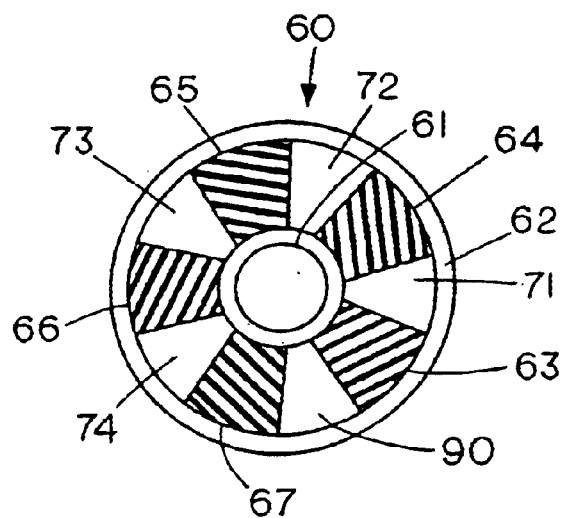
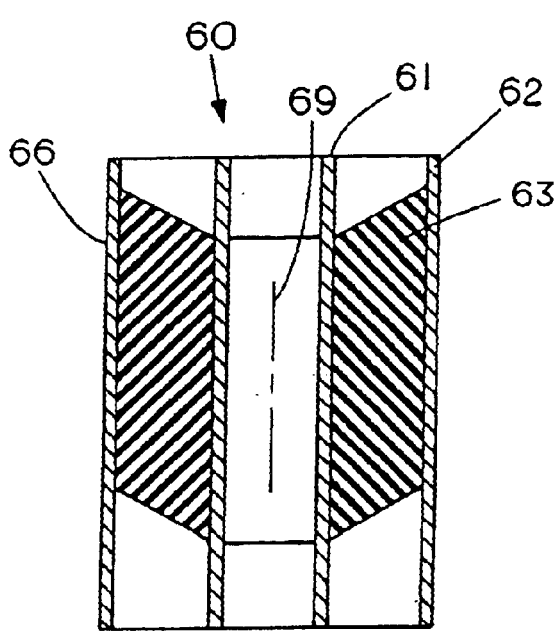

SHOCK AND VIBRATION SYSTEM

FIELD OF THE INVENTION

This invention relates generally to shock and vibration isolation systems and more specifically to a compact symmetrical shock and vibration isolation system that provides three axis isolation for shock and vibration.

BACKGROUND OF THE INVENTION

The concept of shock isolation systems is known in the art. Typically, shock mounts support a cabinet or workstation through a set of shock mounts that enable an external shock to the system to be attenuated by the shock mounts before it damages equipment mounted in the cabinet or the workstation.

The present invention comprises an improved shock and vibration isolation system wherein a plurality of shock mounts arranged in symmetrical condition provide for three axis shock and vibration protection while at the same time providing a compact system wherein the system can utilize the interaction between adjacent components to assist in attenuation of shocks and vibrations.

SUMMARY OF THE INVENTION

Briefly, the present invention comprises a compact shock and vibration isolation system whereby a plurality of shock mounts are cantileverly and symmetrically positioned between an outer member and an inner member which is centrally positioned with respect to the outer member to enable the equipment located thereon to assist in attention of shock and vibration.

BRIEF DESCRIPTION OF THE DRAWINGS

FIG. 5 is top view of a compact shock and vibration system having a rectangular platform cantileverly supported by a center member;

FIG. 6 is a top view of a cylindrical compact shock and vibration system with a shock and vibration isolation compartment located centrally within an outer cylindrical support; and FIG. 7 is a side sectional view of the compact shock and vibration system of FIG. 6.

DESCRIPTION OF THE PREFERRED EMBODIMENT

Figure 1:
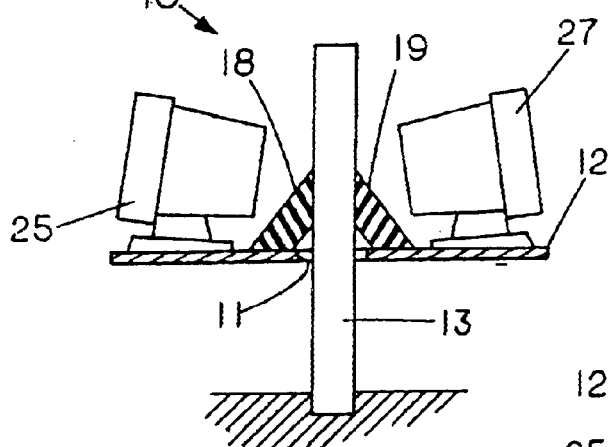
FIG. 1 is a side section view of a compact shock and vibration system having a radially extending platform.

FIG. 1 is a side sectional view of a compact shock and vibration system 10 having a radially extending platform 12. A rigid mounted center pole 13 extends vertically upward through a central opening 11 in platform 12. Shock and vibrations, which are received by center pole 13, are isolated from the platform 12 by the symmetrical positioning of radially extending shock mounts 18, 19, 20 and 21 (see FIG. 2). Opening 11 provides sufficient radially spacing between center pole 13 and platform 12 so that a shock or vibration to the center pole 13 does not produce platform displacement sufficient to produce direct contact between the center pole 13 and platform 13. FIG. 1 shows that cantileverly extending outward from center pole 13 are elastomeric shock mounts 18 and 19 that each have one end fixedly secured to pole 13 and the other end fixedly secured to platform 12. A first workstation 27 and a second workstation 28 are shown mounted on platform 12.

Figure 2:
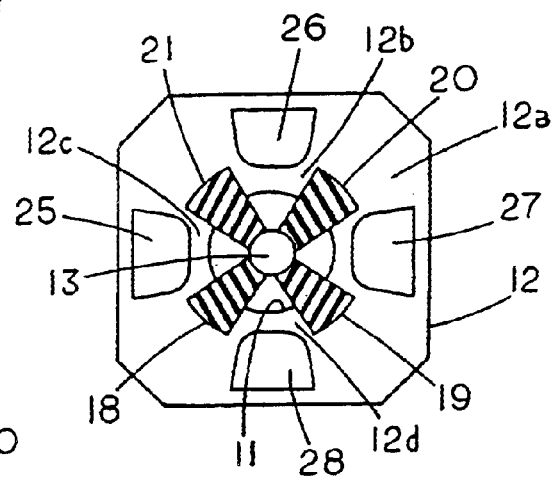
FIG. 2 is a top view of the compact shock and vibration system of FIG. 1.

FIG. 2 is a top view of the compact shock and vibration system of FIG. 1 showing four elastomeric shock mounts 18, 19, 20 and 21 radially and symmetrically positioned about center pole 13, much like the spokes on a wheel. Each of elastomeric shock mounts 20 and 21 have one end fixedly secured to pole 13 and the other end fixedly secured to platform 12. Platform 12, which extends radially outward from the center pole 13, includes a first workstation 25, a second workstation 26, a third workstation 27 and a fourth workstation 28. Each of the workstations are symmetrically positioned around the periphery of platform 12 as are the elastomeric shock mounts 18, 19, 20 and 21.

In order to provide compactness to the system the workstations can be partially or fully mounted in the radial sector spaces extending between adjacent radially extending elastomers shock mounts. FIG. 2 illustrates that workstation 27 is partially mounted within the radial sector space 12a, which is located between radially extending elastomer shock mounts 19 and 20. Similarly, workstation 26 is partially mounted within the radial sector space 12b which is located between elastomeric shock mounts 20 and 21, workstation 25 is partially mounted within the radial sector space 12c, which is located between elastomeric shock mounts 21 and 18, and workstation 28 is partially mounted within the radial sector space 12d, which is located between elastomeric shock mounts 18 and 19.

By placing the workstations partially or completely within the radial sector spaces one can increase the compactness of the shock and vibrations isolation system. System 10 allows the inertia of the multiple workstation to provide greater stability in the platform 12 by the static coupling of the workstations about a common axis through center pole 13. In addition, the symmetrical positioning of both the elastomeric shock mounts and the workstation ensures that there is equivalent shock and vibration attenuation from any direction normal to the longitudinal axis of center pole 13. A further feature of system 10 is that each of the workstation are readily accessible for maintenance since the workstations are mounted on top of the platform 12.

Figure 3:
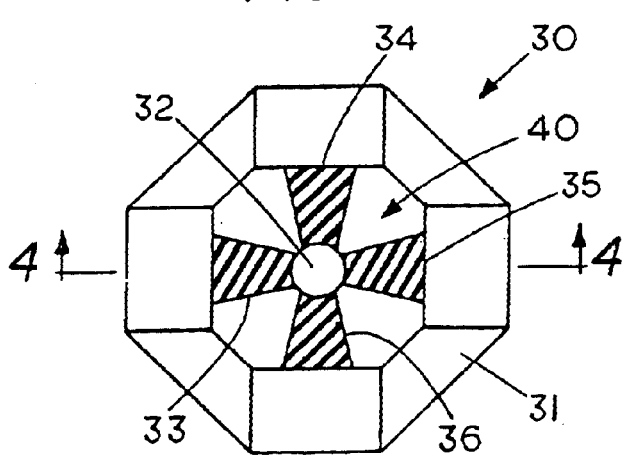
FIG. 3 is top view of a compact shock and vibration system having cabinets peripherally positioned about a center support.

FIG. 3 is top view of an alternate embodiment of a compact shock and vibration system 30 having a peripheral cabinet 31 positioned about a center support 32. Peripheral cabinet 30 is shown partially supported by a first set of upper elastomeric shock mounts 40 comprising elastomeric shock mounts 32, 33, 34 and 35. The first elastomer shock mount 33 has a first end secured to outer peripheral cabinet 31 and a second end secured to center post 32 to provide partial cantilever support to peripheral cabinet 31. Similarly, second elastomer shock mount 34 has a first end secured to outer peripheral cabinet 31 and a second end secured to center post 32 to provide partial cantilever support to peripheral cabinet 31, third elastomer shock mount 35 has a first end secured to outer peripheral cabinet 31 and a second end secured to center post 32 to provide partial cantilever support to peripheral cabinet 31 and fourth elastomer shock mount 34 has a first end secured to outer peripheral cabinet 31 and a second end secured to center post 32 to provide partial cantilever support to peripheral cabinet 31 with the four symmetrical positioned elastomeric shock mounts coacting to normally maintain the peripheral cabinet 31 in a concentric position with respect to center mounting post 32.

Figure 4:
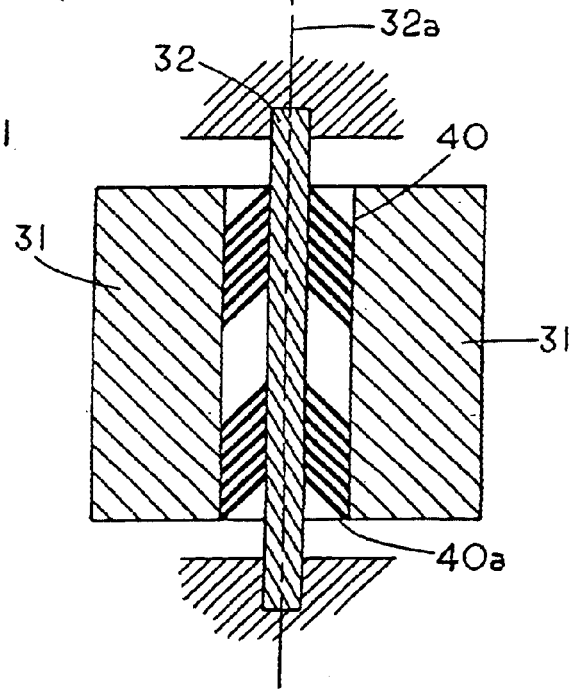
FIG. 4 is a side sectional view of the compact shock and vibrations system of FIG. 3.

FIG. 4 is a side sectional view of the compact shock and vibrations system of FIG. 3 illustrating that the peripheral cabinets 31 extend vertically along the center post 32 to provide for vertical storage space within the cabinets. In the embodiments shown the peripheral cabinet 31 includes a second set of elastomer shock mounts 40a which are identical to the first set of elastomer shock mounts 40. The purpose of the second set of shock mounts is to provide for spaced elastomeric support along an axis 32a through post 32, thus enabling the support of an elongated peripheral cabinet 31 therearound.

In the embodiment shown in FIG. 3 and FIG. 4 the elongated peripheral cabinet 31 is located radially exterior of the elastomer shock mounts with the elastomeric shock mounts cantileverly mounted and symmetrical spaced with the elastomeric shock mounts positioned at an approximate 45 degree angle so as to provide shock and vibration isolation in all three mutually coordinate axis.

FIG. 5 is top view of a compact shock and vibration system 50 having a horizontal extending rectangular platform 51 positioned normally outward of and cantileverly supported by a center member 52. Member 52 comprises an elongated wall with a first elastomeric mount 53 having a first end connected to platform 51 and second end connected to member 52. A second elastomer member 54 has a first end connected to platform 51 and as second end connected to center member 52. On the opposite side of system 50 a third elastomeric mount 55 having a first end connected to platform 51a and second end connected to member 52. A second elastomer member 54 has a first end connected to platform 51 and as second end connected to center member 52. System 50 provides for symmetrical positioning of elastomeric shock mounts on each side of wall 52 so that the platform 51a, which connects to platform 51 thorough supports 51c and 51d moves as a unit to thereby cause the inertia of objects on the platform to aid in shock and vibration attenuation.

FIG. 6 is a top view of compact cylindrical shock and vibration system 60 with a shock and vibration isolation compartment 61 located centrally within an outer cylindrical support member 62, which may be a silo or the like. In the embodiment shown a plurality of elastomeric shock mounts 62, 63, 64, 65, 66 and 67 each extend radially outward from a central cabinet 61 to outer support member 61 to provide central support to cabinet 61. Each of the elastomeric shock mounts are symmetrical positioned to provide symmetrical shock and vibration attenuation to the payload in the cabinet 61 and each of the shock mounts have one end affixed to member 62 and the opposite end affixed to cabinet 61.

FIG. 7 is a side sectional view of the compact shock and vibration system 60 of FIG. 6 with the central cabinet 61 positioned along a vertical axis 69. In this embodiment the protected payload, which is located within central cabinet 61, receives symmetrical peripheral support from each of the elastomeric shock mounts as they coact to attenuate shock and vibrations to the cabinet 61 from radial directions as well as along the vertical axis 69. In system 60 the elongated elastomeric shock mounts are positioned to extend longitudinally between the central cabinet 61 and the outer member 62 which can be rigidly mounted. Access to central cabinet can be obtained through the sector spaces 70, 71, 72, 73 or 74 which are located between each of the adjacent radially extending elastomeric shock mounts.

Thus the present invention comprises a shock and vibration system for symmetrical isolation of shocks. The system includes a first member having an interior space, a second member, with the second member positioned interiorly with respect to the first member and a plurality of elastomeric shock mounts, each of the plurality of elastomeric shock mounts having a first end connected to the first member and a second end connected to the second member with each of the elastomeric shock mounts symmetrical positioned in the interior space to thereby provide either shock or vibration isolation or both between the first member and the second member. The present invention also provides a method of shock and vibration attenuation between a first member and a second member by placing a second member interior to a first member; and symmetrically positioning and mounting a plurality of elastomeric shock mounts between the second member and the first member with each of the elastomeric shock mounts cantileverly extending between the second member and the first member to provide cantilevered support thereto.

We claim:

1. A shock and vibration system for symmetrical isolation of shocks comprising:

a first member comprising a platform having an interior space;

a plurality of workstations, said plurality of workstations symmetrical and concentrically positioned on said platform;

a second member comprising a pole, said pole positioned interiorly with respect to said platform, said pole fixedly mounted with said platform extending radially outward from said pole; and a plurality of elastomeric shock mounts, each of said plurality of elastomeric shock mounts having a first end connected to said platform and a second end connected to said pole with each of said elastomeric shock mounts symmetrical positioned in the interior space to thereby provide shock and vibration isolation between said platform and said pole.

2. A shock and vibration system for symmetrical isolation of shocks comprising:

a first member comprising a platform having an interior space;

a second member comprising a pole, said pole positioned interiorly with respect to said platform, said pole fixedly mounted with said platform extending radially outward from said pole; and a plurality of elastomeric shock mounts, each of said plurality of elastomeric shock mounts having a first end connected to said platform and a second end connected to said pole with each of said elastomeric shock mounts symmetrical positioned in the interior space to thereby provide shock and vibration isolation between said platform and said pole wherein at least four of said elastomeric shock mounts symmetrical positioned around said pole to form radial sector spaces therebetween with a workstation at least partially positioned in each of said radial sector spaces to provide a symmetrical loading of said elastomeric shock mounts with said elastomeric shock mounts cantileverly extending at an acute angle between said first member and said second member.

3. The shock and vibration system of claim 1 wherein said platform is fixedly mounted.

4. The shock and vibration system of claim 1 wherein said pole is fixedly mounted.

5. The shock and vibration system of claim 1 wherein said elastomeric shock mounts cantileverly extend at an acute angle between said platform and said pole.

6. The shock and vibration system of claim 1 wherein said platform circumferentially surrounds said pole.

7. The shock and vibration system of claim 2 wherein said platform is fixedly mounted.

8. The shock and vibration system of claim 2 wherein said pole is fixedly mounted.

9. The shock and vibration system of claim 2 wherein said elastomeric shock mounts cantileverly extend at an acute angle between said platform and said pole.

10. The shock and vibration system of claim 2 wherein said platform circumferentially surrounds said pole.

* * * * *